US006602438B2

(12) United States Patent
Lin

(10) Patent No.: US 6,602,438 B2
(45) Date of Patent: Aug. 5, 2003

(54) STRUCTURE FOR POLYMERIC THERMISTOR AND METHOD OF MAKING THE SAME

(75) Inventor: Chen-Ron Lin, Hsinchu (TW)

(73) Assignee: Protectronics Technology Corporation, Taoyuan (TW)

( * ) Notice: Subject to any disclaimer, the term of this patent is extended or adjusted under 35 U.S.C. 154(b) by 0 days.

(21) Appl. No.: 10/010,264

(22) Filed: Dec. 7, 2001

(65) Prior Publication Data

US 2003/0107466 A1 Jun. 12, 2003

(51) Int. Cl.[7] .......................... B29B 7/02; B29C 35/08; H01B 1/22; H01C 17/00

(52) U.S. Cl. .......................... 252/62.3 T; 252/62.3 C; 252/503; 252/511; 252/513; 252/514; 29/610.1; 338/22 R; 264/328.19; 264/425; 264/473; 264/488

(58) Field of Search .......................... 29/610.1; 264/405, 264/425, 473, 488; 252/62.3 T, 502, 511; 338/22 R

(56) References Cited

U.S. PATENT DOCUMENTS

| | | | | | |
|---|---|---|---|---|---|
| 4,237,441 | A | | 12/1980 | van Konynenburg et al. | 338/22 R |
| 4,304,987 | A | | 12/1981 | van Konynenburg | 219/553 |
| 5,106,540 | A | * | 4/1992 | Barma et al. | 252/511 |
| 6,245,439 | B1 | * | 6/2001 | Yamada et al. | 428/546 |
| 6,291,568 | B1 | * | 9/2001 | Lussey | 524/413 |

* cited by examiner

*Primary Examiner*—Mark Kopec
*Assistant Examiner*—Kallambella M Vijayakumar
(74) *Attorney, Agent, or Firm*—Ladas & Parry

(57) ABSTRACT

A structure for polymeric thermistor device and method of making the same are disclosed. The polymeric thermistor makes use of a polymeric composite filled with conductive filler and show resistance variations at different temperatures. A polymeric substrate filled with conductive filler is cross-linked so that the whole polymeric composite structure filled with conductive filler is able to memorize shape. Then, the cross-linked polymeric composite undergoes a simple-sheared process and turns into a polymeric composite with a strain more than 1%. Therefore, the micro-structure and electrical properties of the conductive filler are changed.

10 Claims, 20 Drawing Sheets

STRUCTURE FOR POLYMERIC THERMISTOR AND METHOD OF MAKING THE SAME

BACKGROUND OF THE INVENTION (A) Field of the Invention

The present invention relates to a structure for a resistance device and method of making the same, and in particular, to a thermistor device and method of making the same, which make use of a polymeric composite filled with a conductive filler and show resistance variations under different temperatures.

(B) Description of Related Art

Thermistor devices have already been widely used in many fields, such as temperature detection, security control, and temperature compensation. In the past, a thermistor device mainly utilizes a ceramic material, but ceramic material needs to be manufacture at a high temperature. In most cases, the temperature can be higher than 900° C. Thus the energy consumption is enormous, and the process is also very complicated.

Later on, a thermistor device utilizing a polymeric substrate is developed. Because the manufacturing temperature of a thermistor device employing a polymeric substrate is under 300° C., it can be easily manufactured and molded. The energy consumption is less, process is easier, and production cost is lower, so its application gets more and more popular as time goes by.

The temperature coefficient of the polymeric composite filled with a conductive filler will show different positive temperature coefficient resistance characteristics in accordance with different quantity of composite contained and different micro structures. This nature can be used to make a variety of resistance devices and positive temperature coefficient thermistor devices.

The Raychem Co. of U.S. utilizes the nature described above to produce a series of resetable polymeric positive temperature coefficient (PPTC) thermistor device (U.S. Pat. No. 4,237,441). When the temperature of the PPTC device reaches a certain switching temperature, the resistance of the PPTC device rises rapidly. Thus it can be applied to the design of over-current protection devices and temperature switch to devices. It can also be made into a Constant Wattage Element (CW type element, U.S. Pat. No. 4,304,987) that has a low sensitivity toward temperature variation. In this manner, it can be applied to the design of heaters.

But the polymeric thermistors of such kind are all positive temperature coefficient thermistors or devices that have low sensitivity toward temperature variation. The resistances either rise with the rising temperature or stay steady without changing with temperature variation. That is to say, the circuit design in actual circuit that applies a thermistor device is limited by the relations between temperature and resistance. For example, if we want to design a circuit, which is automatically activated when temperature reaches a certain level, an additional designed, complicated circuit has to be utilized instead of the traditional polymeric thermistor.

SUMMARY OF THE INVENTION

An object of the present invention is to provide a structure for a polymeric thermistor that has a negative temperature coefficient, so that the circuit design and application are not restricted to the traditional polymeric positive temperature coefficient thermistor. The application of the polymeric thermistor can be thus broadened.

Another object of the present invention is to provide a structure for a polymeric thermistor, wherein when it is put to use for the first time, the resistance is maintained in a relatively high status; but once it has been put to use at a high temperature, which means the temperature of the device has been risen to the glass-transition temperature or melting point of the polymeric substrate, the resistance would be relatively lowered down.

Yet another object of the present invention is to provide a manufacturing method of a structure for a polymeric thermistor, in which a simple-sheared process is used to change the microstructure of the conductive filler.

Still another object of the present invention is to provide a manufacturing method of a structure for a polymeric thermistor. The method manufactures polymeric thermistors filled with conductive filler which have different thermal-sensing natures. Thus, a new perspective of the possible application of the process is given.

To achieve the objects described above, the present invention provides a structure for a polymeric thermistor comprising: a polymeric composite filled with a conductive filler, the polymeric composite including a polymeric substrate; and conductive particles exist in the polymeric substrate, the conductive particles forming a discontinuous phase along a single direction. The polymeric composite has a characteristic of memorize shapes, and when it experiences a certain temperature (the certain temperature is the glass-transition temperature for amorphous thermoplastic materials or thermosetting materials, whereas it is the melting point for crystalline thermoplastic materials), the conductive particles that from a discontinuous phase along a single direction join to each other and become a conductive continuous phase. Thus, the mechanical stress of the polymeric thermistor is eliminated and the conductivity rises after temperature rose, so the polymeric thermistor can be a thermistor having a negative temperature coefficient, or in another case, when the polymeric thermistor is heated, the resistance of the polymeric thermistor can be lowered to a constant value. With the characteristics, the design and application of related circuits are not restricted to the traditional polymeric positive temperature coefficient thermistor and thus, the application of the polymeric thermistor is broadened.

Moreover, the method of manufacturing a structure for a polymeric thermistor provided by the present invention performs a cross-linking process to the polymeric substrate filled with conductive particles, so that the whole structure of polymeric composite filled with conductive particles is able to memorize shapes. Then, a simple-sheared process is performed to the polymeric composite for it to have a strain more than 1%, and thus changes the microstructure and electrical properties of the conductive filler.

BRIEF DESCRIPTION OF THE DRAWINGS

The present invention is described below by way of examples with reference to the accompanying drawings which will make readers easier to understand the purpose, technical contents, characteristics and achievement of the present invention, wherein.

DETAILED DESCRIPTION OF THE INVENTION

First Embodiment: Constant Wattage Type (CW)

Figure 1:
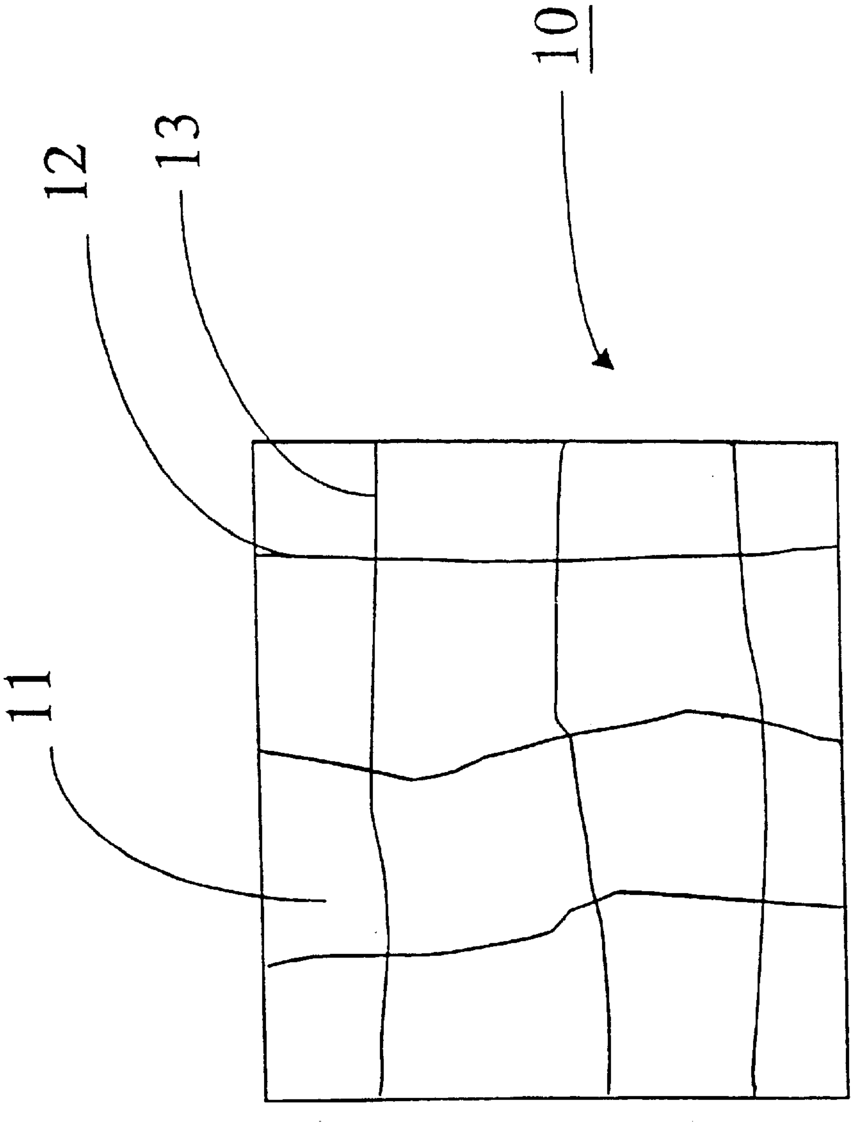
FIG. 1 is a process diagram of a first embodiment of the present invention.
Figure 2:
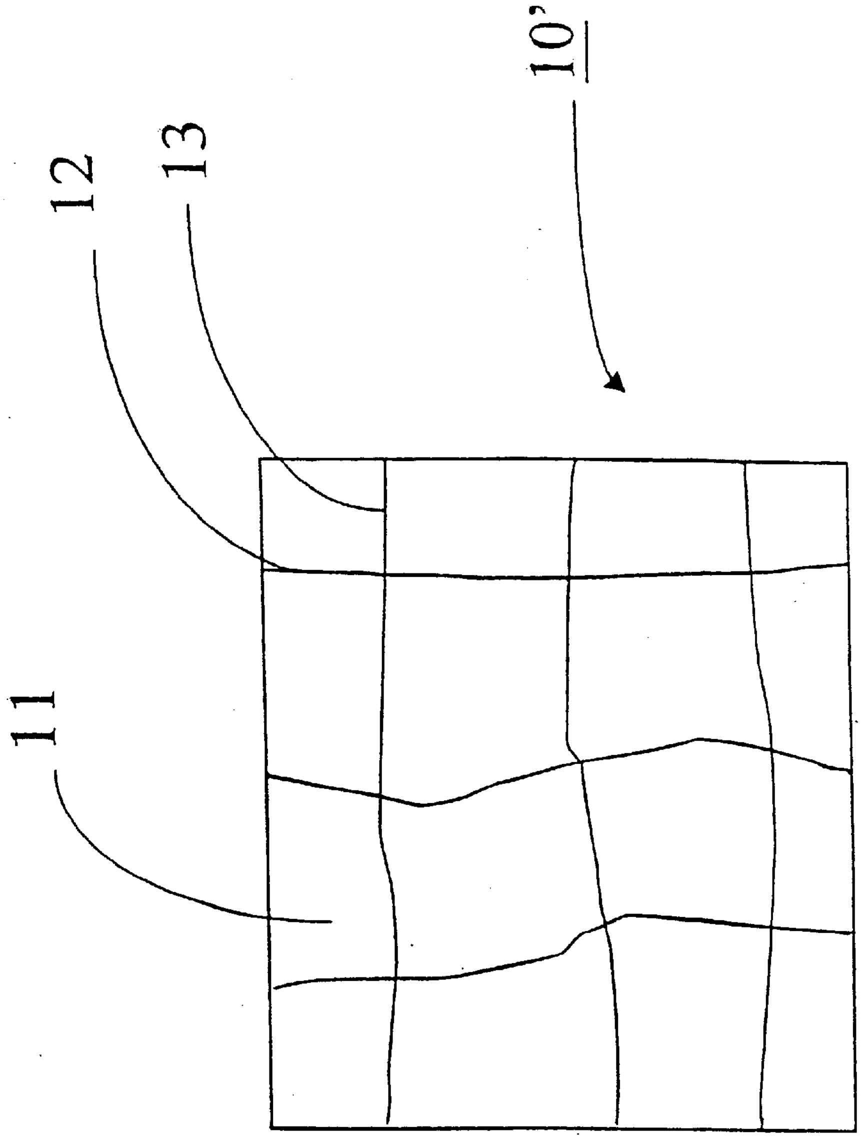
FIG. 2 is another process diagram of the first embodiment of the present invention.
Figure 3:
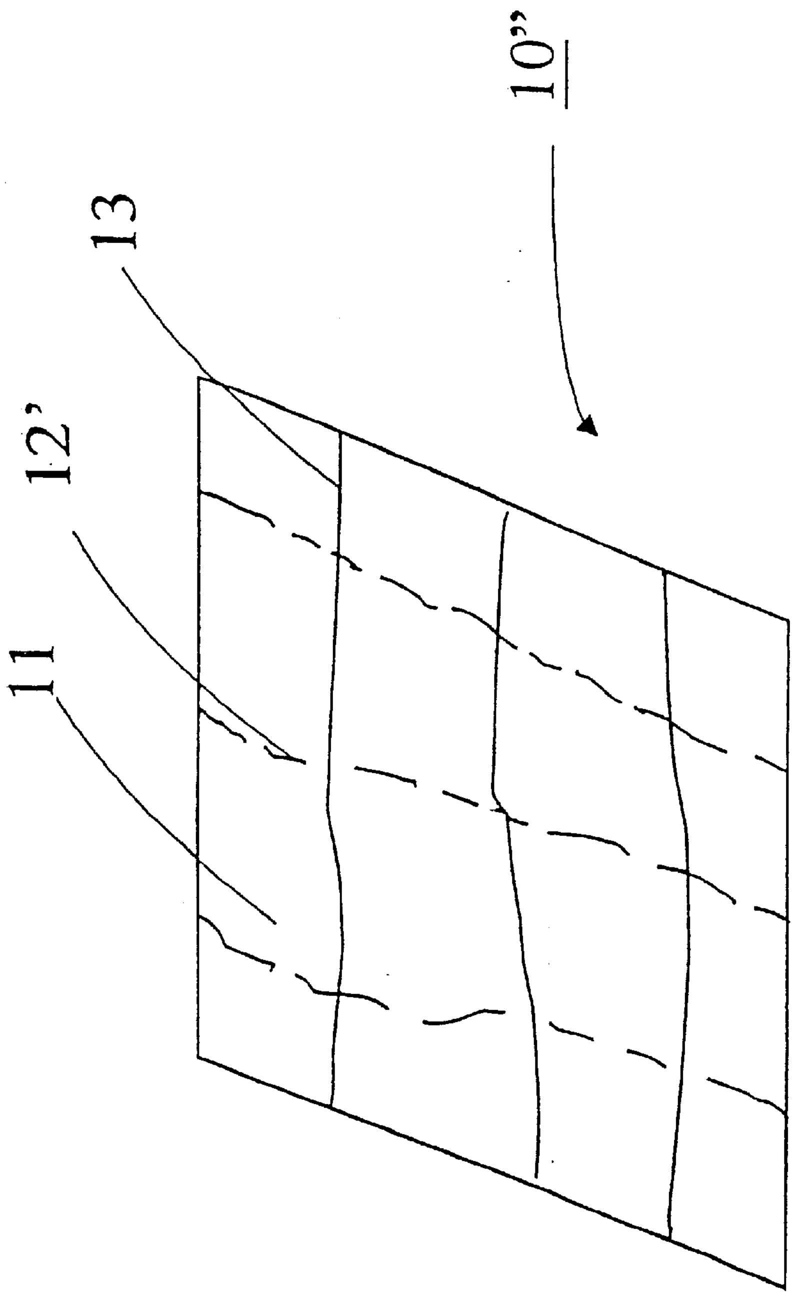
FIG. 3 is yet another process diagram of the first embodiment of the present invention.
Figure 20:
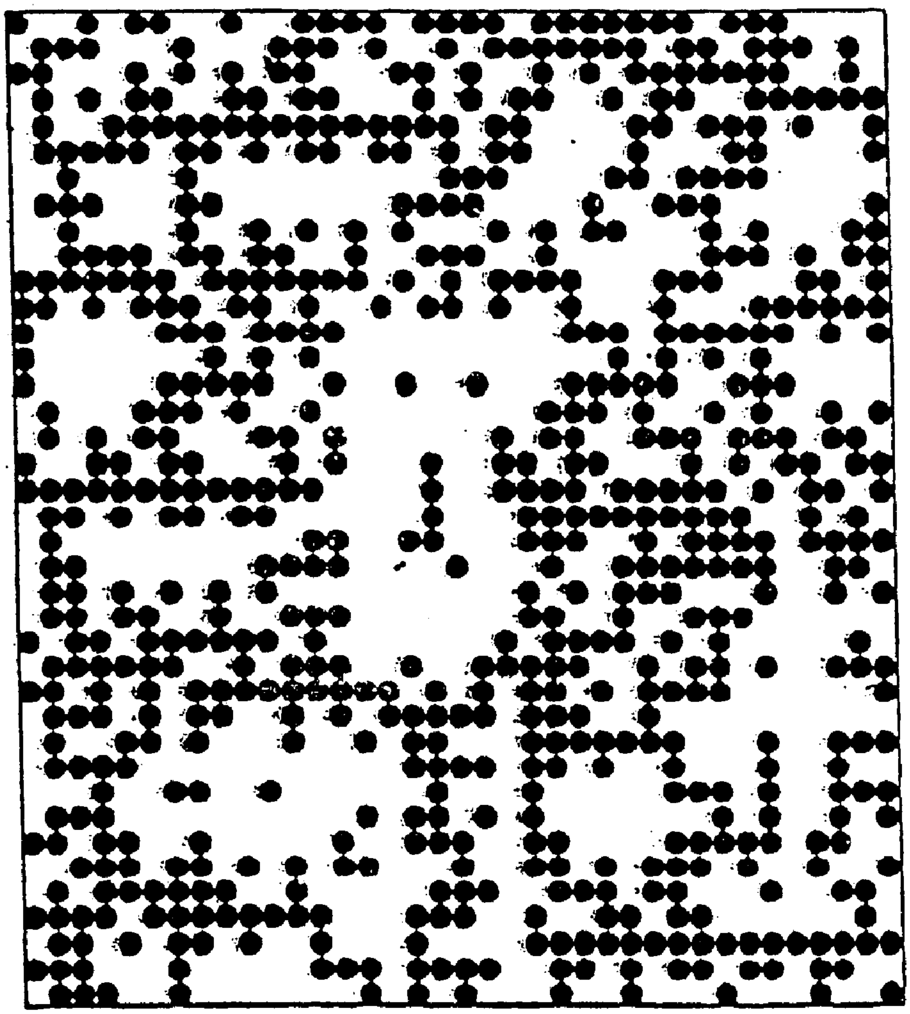
FIG. 20 depicts a blend of a polymeric substrate and conductive particles.

FIGS. 1 to 3 show the producing progress of the first embodiment of the present invention. In the embodiment, a high-density polyethylene (HDPE) LH606 (a product of USI Far East Co.) is used as a polymeric substrate 11, and a highly conductive carbon black 30 Ketjenblack EC (a product of a Dutch company, AKZO); has a DBP (Dibutyl Phthalate) oil absorption for about 360 ml/100 g, referring to U.S. Pat. No. 4,304,987) is used as conductive particles. FIG. 1 illustrates conductive particles 12 aligned in a first direction, and conductive particles 13 aligned in a second direction. The weight percentage of the conductive particles mixed in the substrate is in the range of 5% to 50%. In the present embodiment, the weight percentage of the conductive particles mixed in the substrate is 10%, so that the polymeric substrate 11 mixed with conductive particles turned into a filled composite 10 as shown in FIG. 20.

If we use Gamma Rays with a dosage more than 10 Mrads or electron beams with a certain intensity to irradiate the filled composite, the polymeric substrate phase would be cross-linked. Thus the whole filled composite would have the ability to memorize shapes. In another case, peroxides can be added into the composite to give rise to a chemical reaction, and then the composite would be able to memorize shapes. In the present embodiment, the filled composite 10 is irradiated by Co-60 with a dosage of 15 Mrads to cause a cross-link reaction, and thus the filled composite 10 turns into a filled composite 10' that is able to memorize shapes as shown in FIG. 2.

Referring to FIG. 3, the filled composite 10' that is able to memorize shapes is then processed by a simple shear. The strain of the simple shear is in the range of 5% to 300%. The strain applied in the present embodiment is about 100%, and thus the conductive particles 12 aligned in the first direction turn into conductive particles 12' having a discontinuous phase aligned in a single direction from the original conductive continuous phase. That is to say, the alignment of the conductive particles is not conductive now, and the filled composite 10' that is able to memorize shapes becomes filled composite 10" after being processed.

Figure 4:
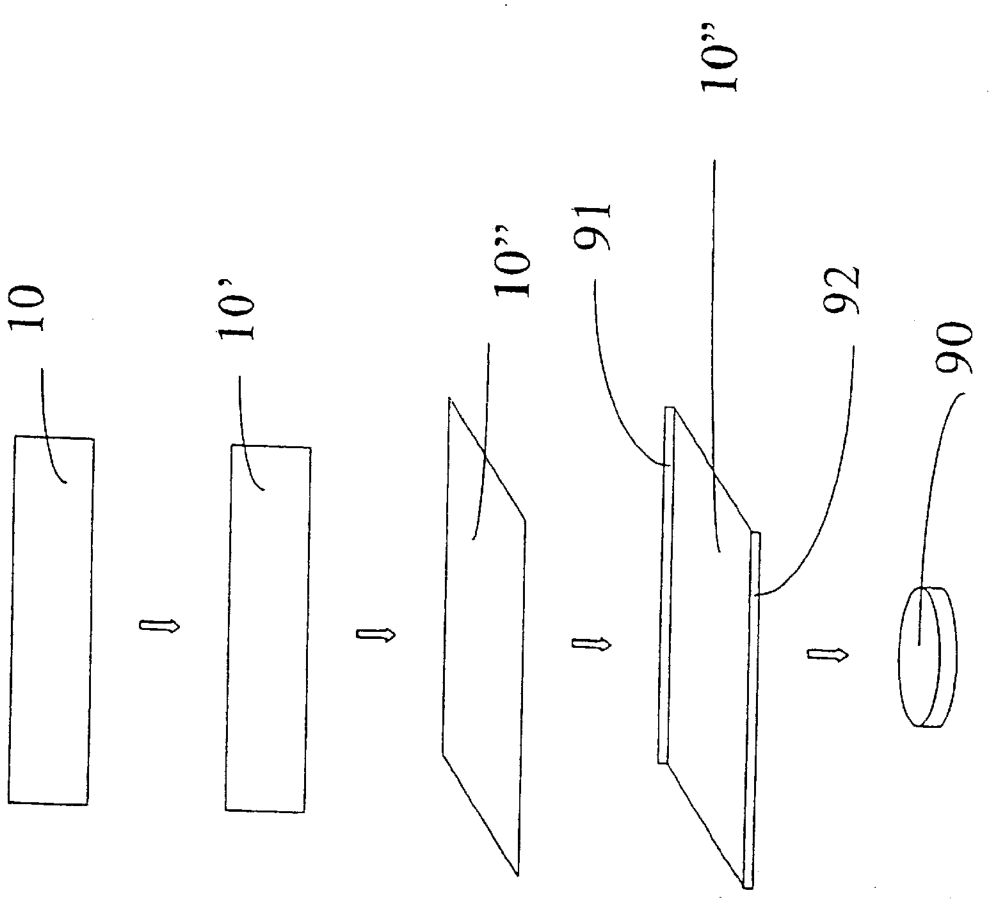
FIG. 4 is a manufacturing diagram of a thermistor of the first embodiment of the present invention.
Figure 5:
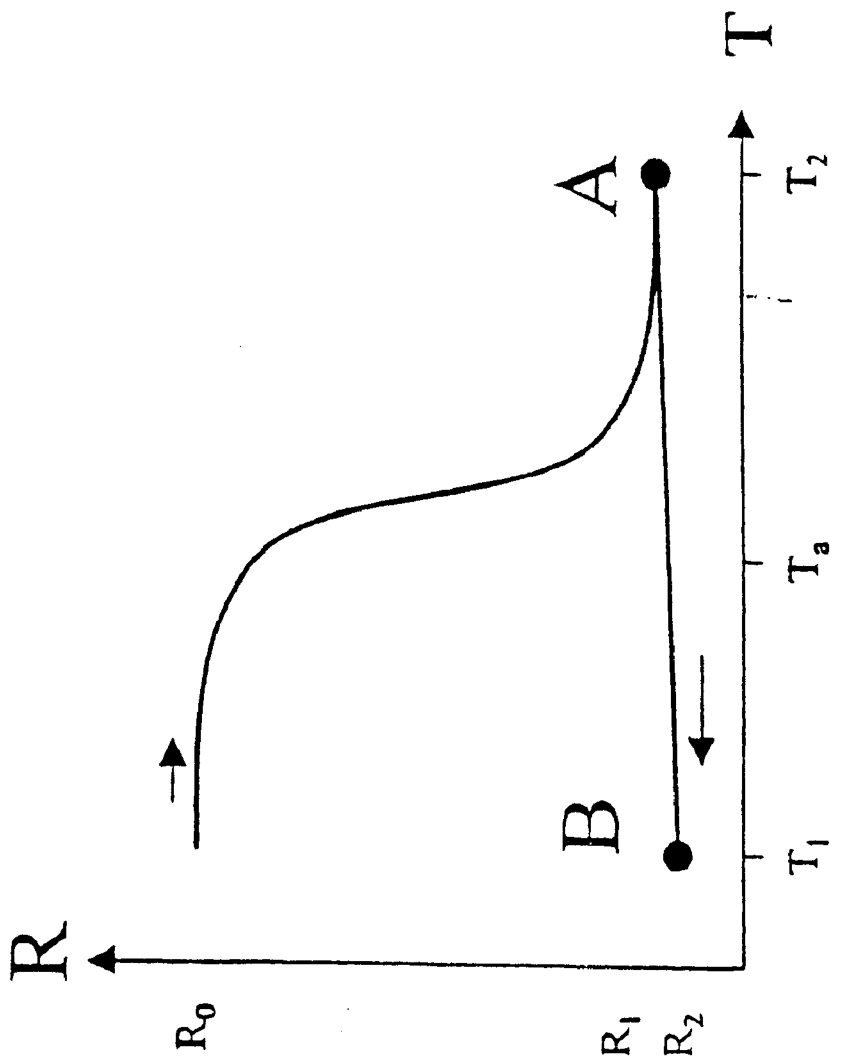
FIG. 5 is a resistance vs. temperature diagram of the thermistor according to the first embodiment of the present invention.

Referring to FIG. 4, electrodes 91 and 92 are added to the filled composite 10", and then the processed filled composite 10" is segmented into a thermistor device 90 with a diameter of 15 mm. The thermistor device 90 is heated to a temperature above the melting point of the HDPE for the filled composite 10" to recover to the memorized shape, and the melting point of the HDPE is about 130° C. In the present embodiment, the filled composite is heated to 150° C. to be melted, and thus the deformed filled composite 10" due to the shear process recovers to the original memorized shape 10". Meanwhile, the conductive particles 12' aligned in the first direction also get back to the conductive continuous structure 12, and the resistance also decreases to a low resistance status as shown in FIG. 5. After the temperature drops, the structure of the conductive particles 12 aligned in the first direction in the filled composite 10' still maintains in a low resistance status.

Figure 6:
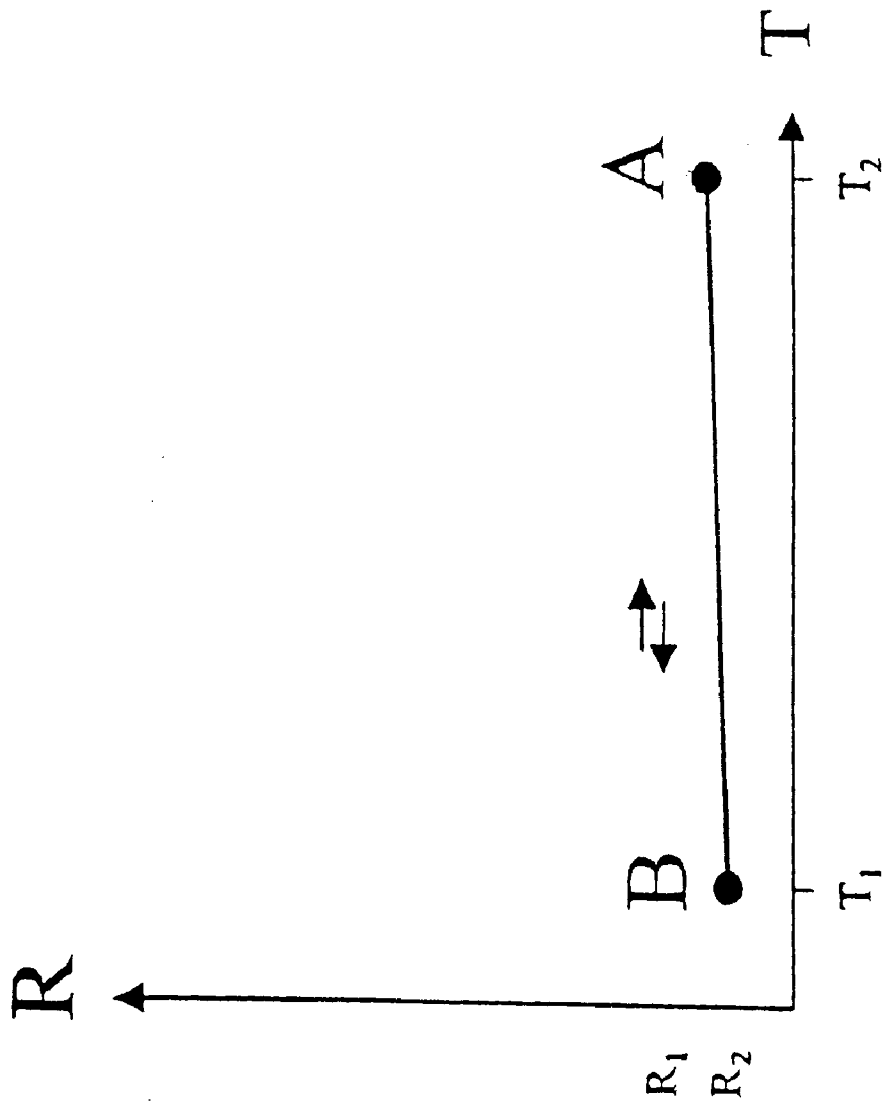
FIG. 6 is another resistance vs. temperature diagram of the thermistor according to the first embodiment of the present invention.

Referring to FIG. 5, which depicts the relation between resistance and temperature of the thermistor device 90. The X-axis is temperature, and the Y-axis is resistance. When a thermistor device is heated up from the room temperature, its initial resistance is a high resistance $R_0$. After the temperature rose to the melting point Ta of the polymeric substrate (about 130° C.), the crystalline phase of the filled composite 10" starts to melt, and the conductive particles 12' which are initially in a conductive discontinuous phase along the first direction get back to the original conductive continuous structure (conductive particles 12 aligned in the first direction). In the meantime, the resistance is lowered to a low resistance $R_1$ at point A (in which $R_0>100R_1$). Afterward, the temperature drops to under the room temperature $T_1$, and the resistance of the thermistor device 90 decreases to a low resistance $R_2$ at point B. Referring to FIG. 6, even if the thermistor device 90 is heated up again to a temperature higher than the melting point, the resistance of the thermistor device will not go back to $R_0$ anymore.

However, due to the differences in the formula and the ingredients of the polymeric substrate and conductive particles that have been used, the resistance of the thermistor device 90 may slightly rise or drop because of the rise of the temperature. However, the difference between the resistance and $R_1$ in comparison with the difference between the resistance and original $R_0$ is very slightly.

In fact, the material of the polymeric substrate used in the present invention is not limited to the high-density polyethylene (HDPE), as long as a composite with enough mechanical strength to support the strain of simple shear and without conductivity can be used. Thus for people skilled in the art can change the selection of polymeric material. For example, various kinds of crystallized polymeric materials, such as low-density polyethylene (LDPE), linear low-density polyethylene (LLDPE), polypropylene, or other alkene copolymers, such as ethylene-acrylic acid copolymer or other amorphous polymeric materials, can all achieve similar effect. As for the conductive particles, other conductive materials that can achieve similar effect can also be used, such as nickel powder, silver powder, or graphite.

Second embodiment: polymeric positive temperature coefficient thermistor

Figure 7:
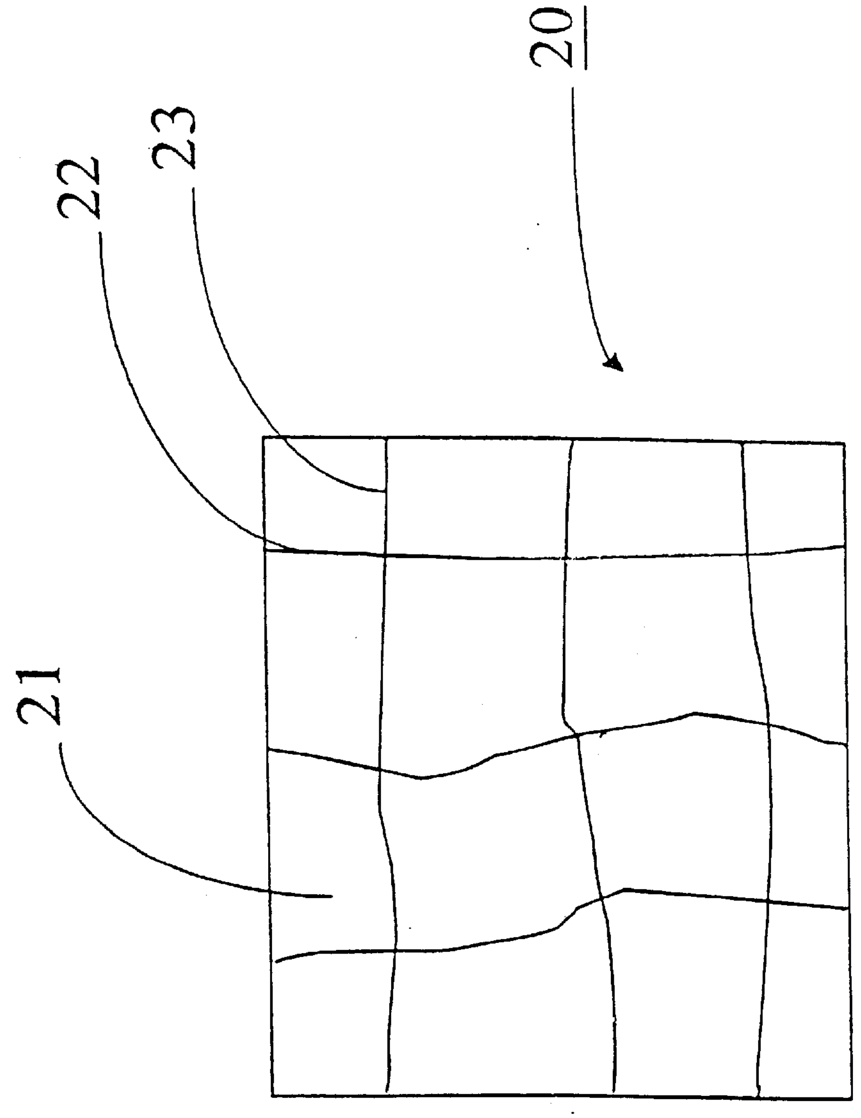
FIG. 7 is a process diagram of a second embodiment of the present invention.
Figure 8:
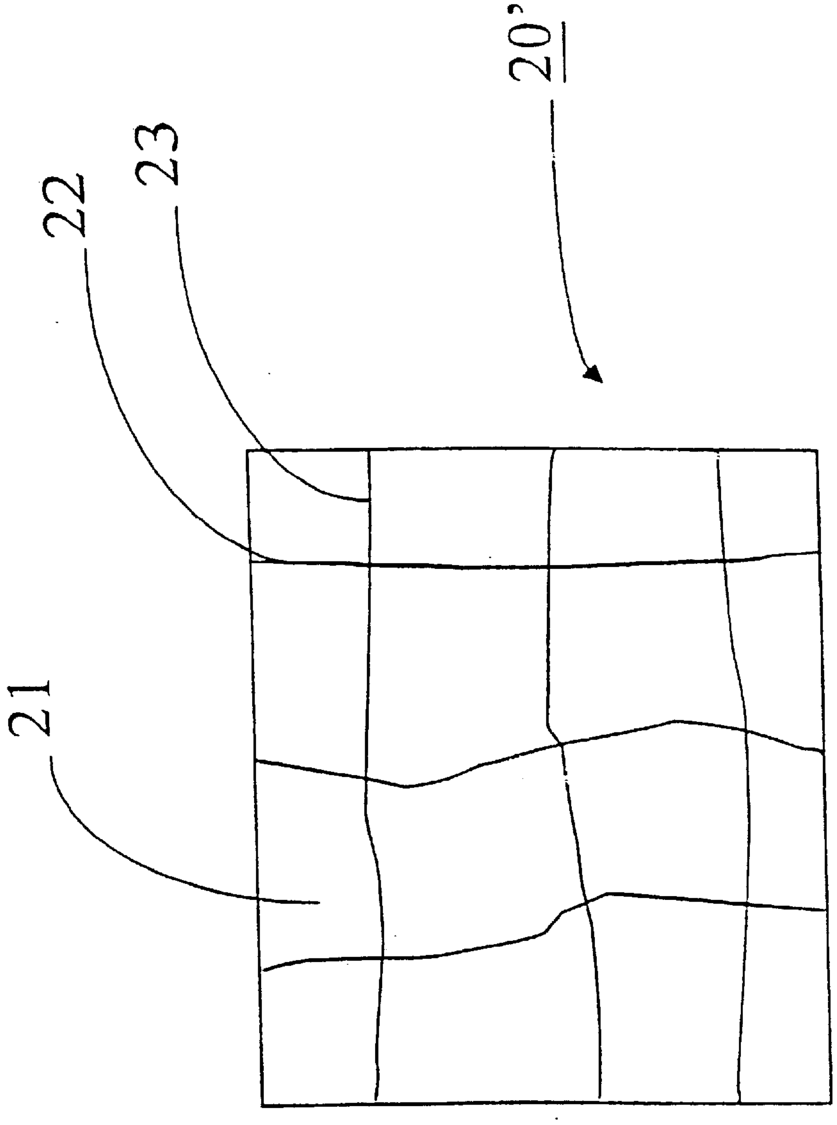
FIG. 8 is another process diagram of the second embodiment of the present invention.
Figure 9:
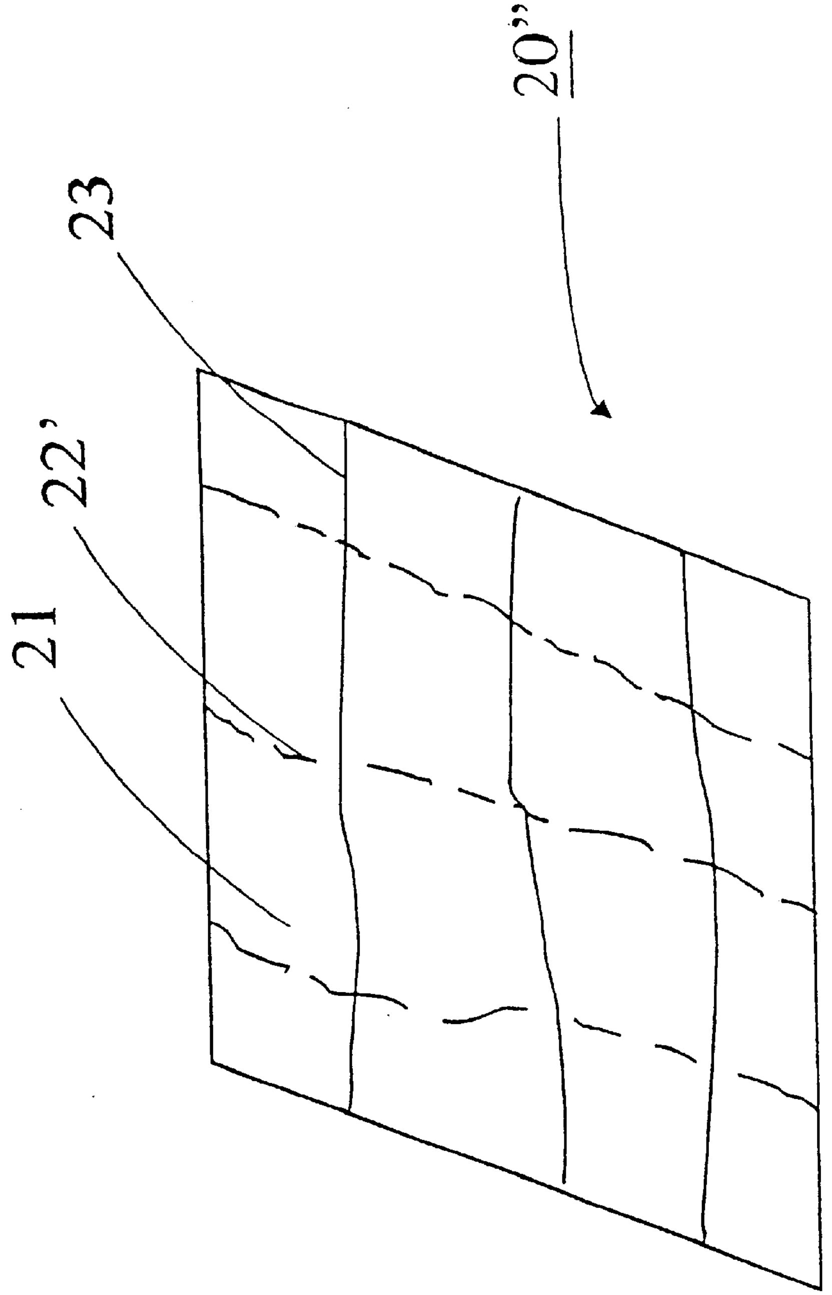
FIG. 9 is yet another process diagram of the second embodiment of the present invention.

FIGS. 7 to 9 show the producing progress of the second embodiment of the present invention. In the embodiment, a high-density polyethylene (HDPE) LH901 (a product of USI Far East Co.) is used as a polymeric substrate 21, and a nickel/graphite composite powder (a product of Westaim Specialty Materials Corporation, a Canadian company) is used as conductive particles. The weight percentage of these conductive particles mixed in the substrate is in the range of 65% to 90%. In the present embodiment, the weight percentage of the conductive particles mixed in the substrate is 75%. FIG. 7 shows conductive particles 22 aligned in a first direction, and conductive particles 23 aligned in a second direction, thus the polymeric substrate mixed with conductive particles becomes a filled composite 20.

Similarly, if we use Gamma Rays with a dosage more than 10 Mrads to irradiate the filled composite 20, the polymeric substrate phase would be cross-linked. Thus the whole filled composite would have the ability to memorize shapes. In the present embodiment, the filled composite 20 is irradiated by Co-60 with a dosage of 20 Mrads to cause a cross-link reaction in the filled composite 20. Thus the filled composite 20 turns into a filled composite 20' that is able to memorize shapes as shown in FIG. 8.

Referring to FIG. 9, the filled composite 20' possessing the ability to memorize shapes is then processed by a simple shear. The strain of the simple shear is in the range of 1% to 300%. The strain applied in the present embodiment is about 100%, and thus the conductive particles 22 aligned in the first direction turn into conductive particles 22' having a discontinuous phase aligned in a single direction from the original conductive continuous phase. The filled composite 20' that is able to memorize shapes becomes filled composite 20" after the process. That is to say, the alignment of the conductive particles 22' aligned in the first direction in the filled composite 20" after the process is not conductive now.

Figure 10:
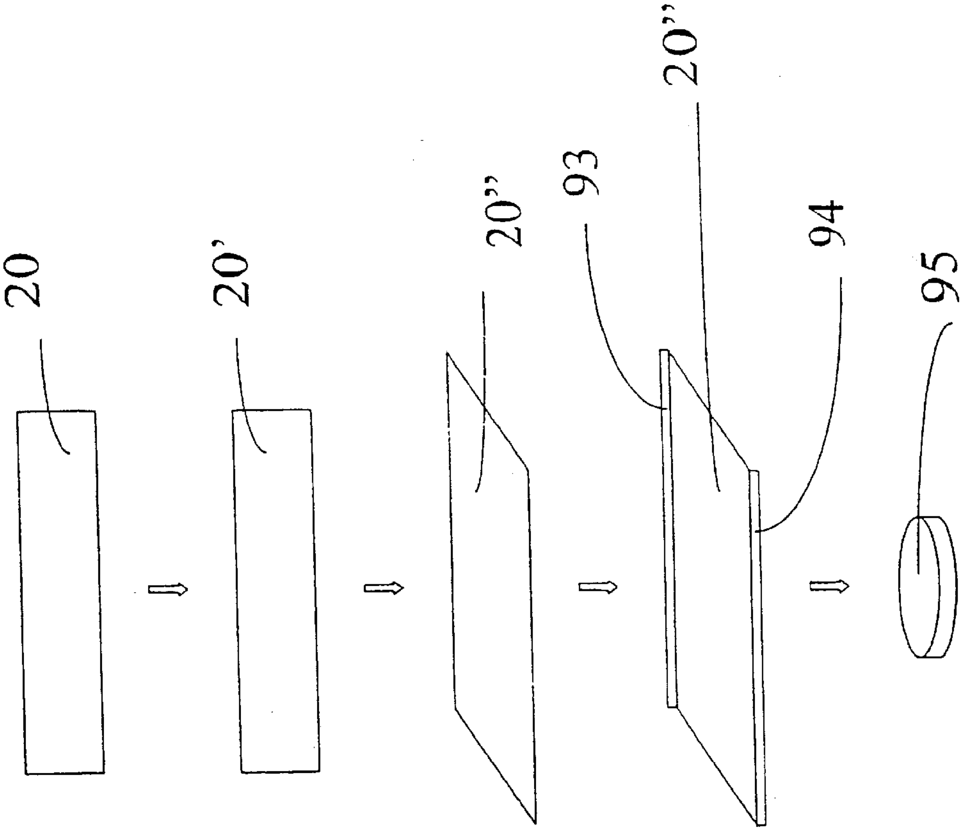
FIG. 10 is a manufacturing diagram of a thermistor of the second embodiment of the present invention.
Figure 11:
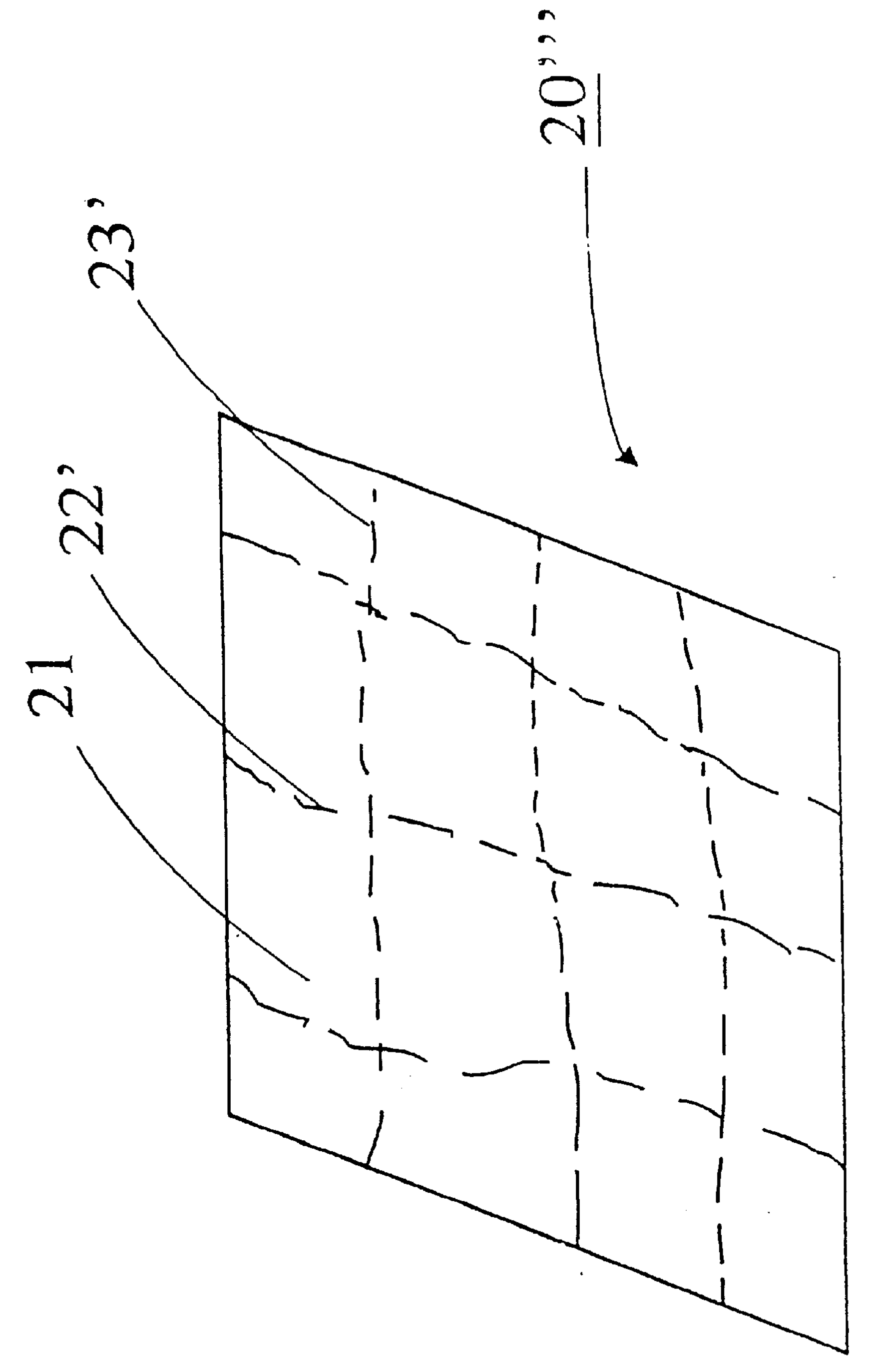
FIG. 11 is a manufacturing mechanical deforming diagram of the second embodiment of the present invention.

Referring to FIG. 10, electrodes 93 and 94 are added to the filled composite 20", and then the processed filled composite 20" is segmented into a thermistor device 95 with a diameter of 15 mm. The thermistor device 95 is heated to 150° C. to melt the HDPE, and then the filled composite 20" that is deformed due to the simple shear process recovers to the original memorized shape 20'. Although the 100% strain is eliminated, the volume of the HDPE substrate phase expands more than 10% when the filled composite 20" is heated up to a temperature higher than the melting point. Referring to FIG. 11, the connecting strength between conductive particles in the present embodiment is lower than the high structure conductive carbon black in the first embodiment due to the usage of nickel/graphite composite powder as conductive particles. Thus the nickel-plated graphite powder breakdowns from the expansion of the substrate, and both the alignments of the conductive particles 22' aligned in the first direction and the conductive particles 23' aligned in the second direction form discontinuous and non-conductive structures.

Figure 12:
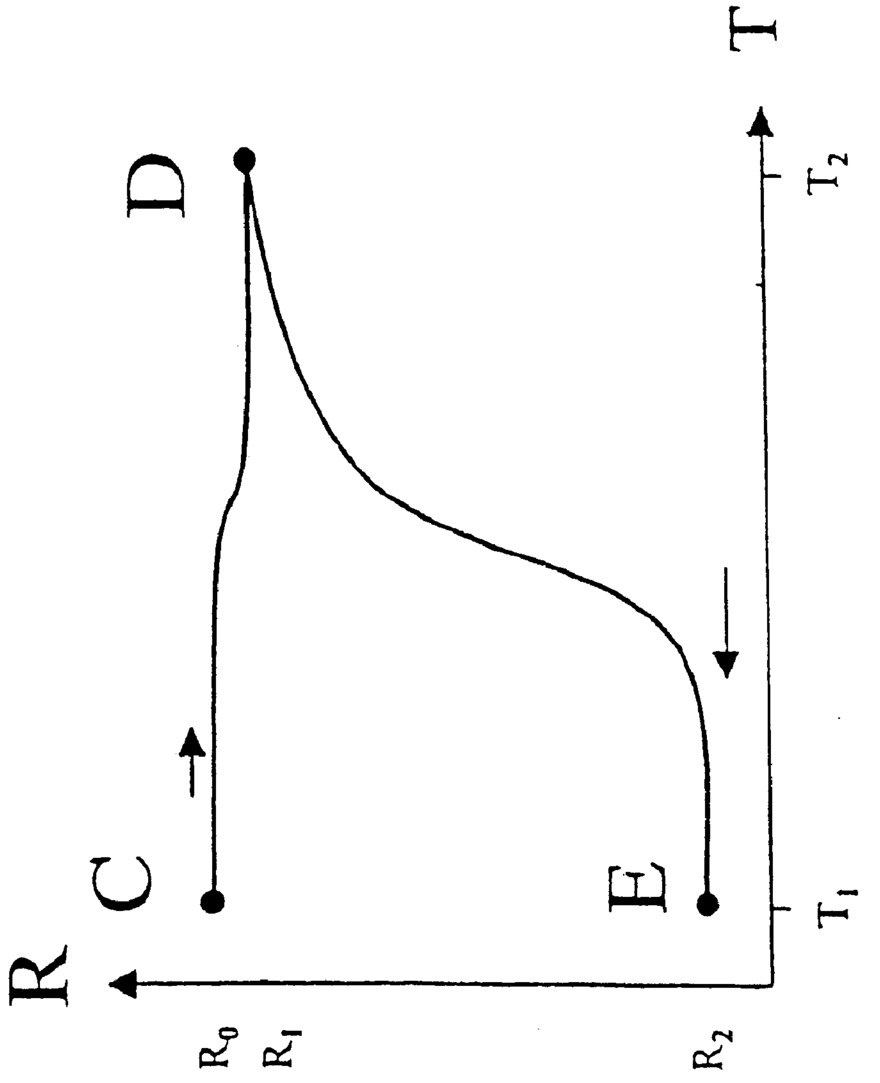
FIG. 12 is a resistance vs. temperature diagram of the thermistor of the second embodiment of the present invention.
Figure 13:
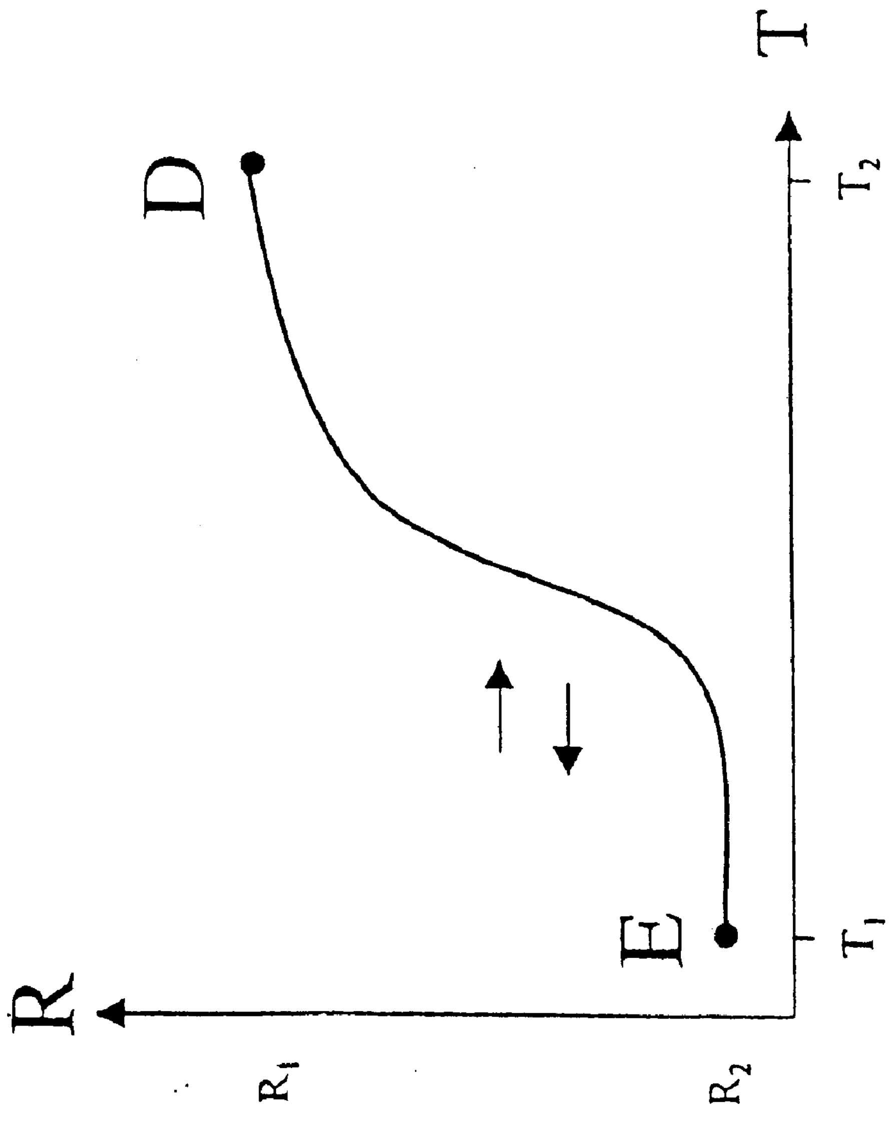
FIG. 13 is another resistance vs. temperature diagram of the thermistor of the second embodiment of the present invention.

Referring to FIG. 12 and FIG. 13, the resistance of the thermistor device remains at a high resistance $R_1$ state at point D when the temperature rises from temperature $T_1$ to temperature $T_2$ ($T_2$ is 150° C.). When the temperature goes back to the room temperature $T_1$, the volume of the HDPE shrinks significantly from crystallization and thus, conductive particles that are breakdown from the expansion of the HDPE substrate recover to a connected conductive state. As a result, the resistance is lowered to a low resistance $R_2$ state at point E. Afterward, the device returns to be a normal polymeric positive temperature coefficient (PPTC) device, whose resistance remains at a low resistance state at room temperature and remains at a high resistance state when temperature is risen to above the melting point of the polymeric substrate.

Third embodiment: polymeric positive temperature coefficient thermistor

Figure 14:
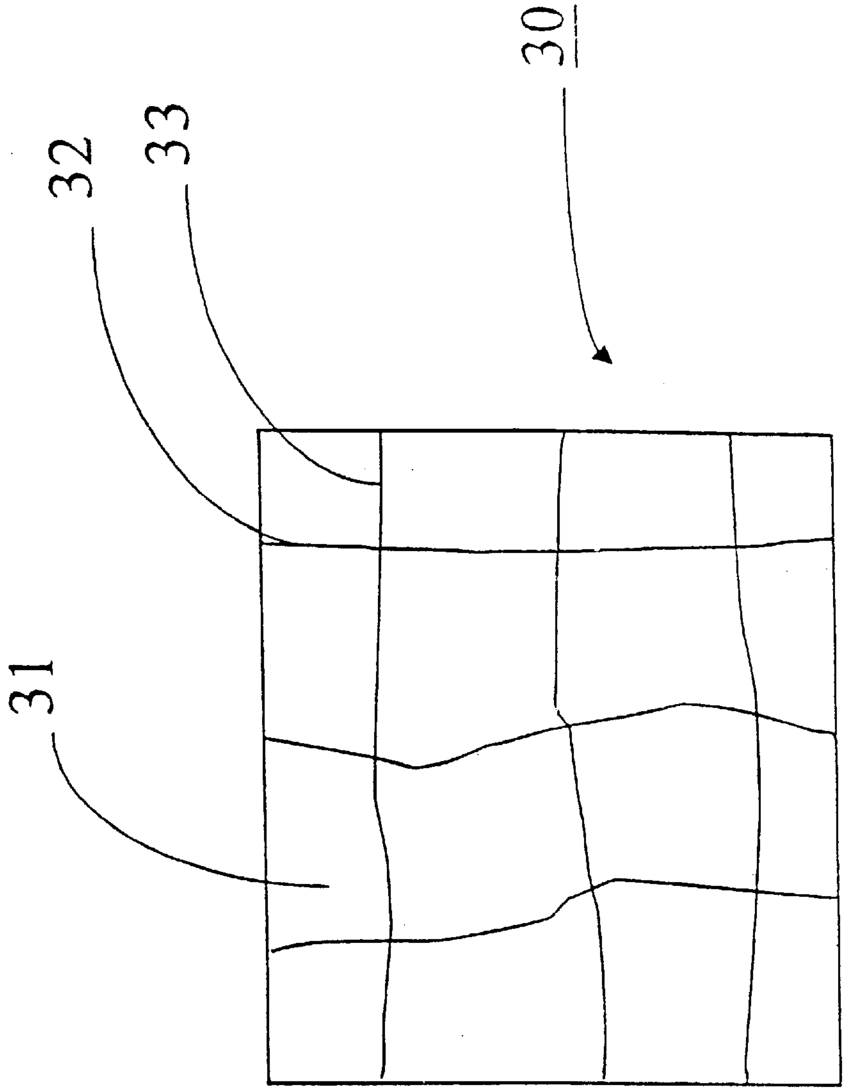
FIG. 14 is a process diagram of a third embodiment of the present invention.
Figure 15:
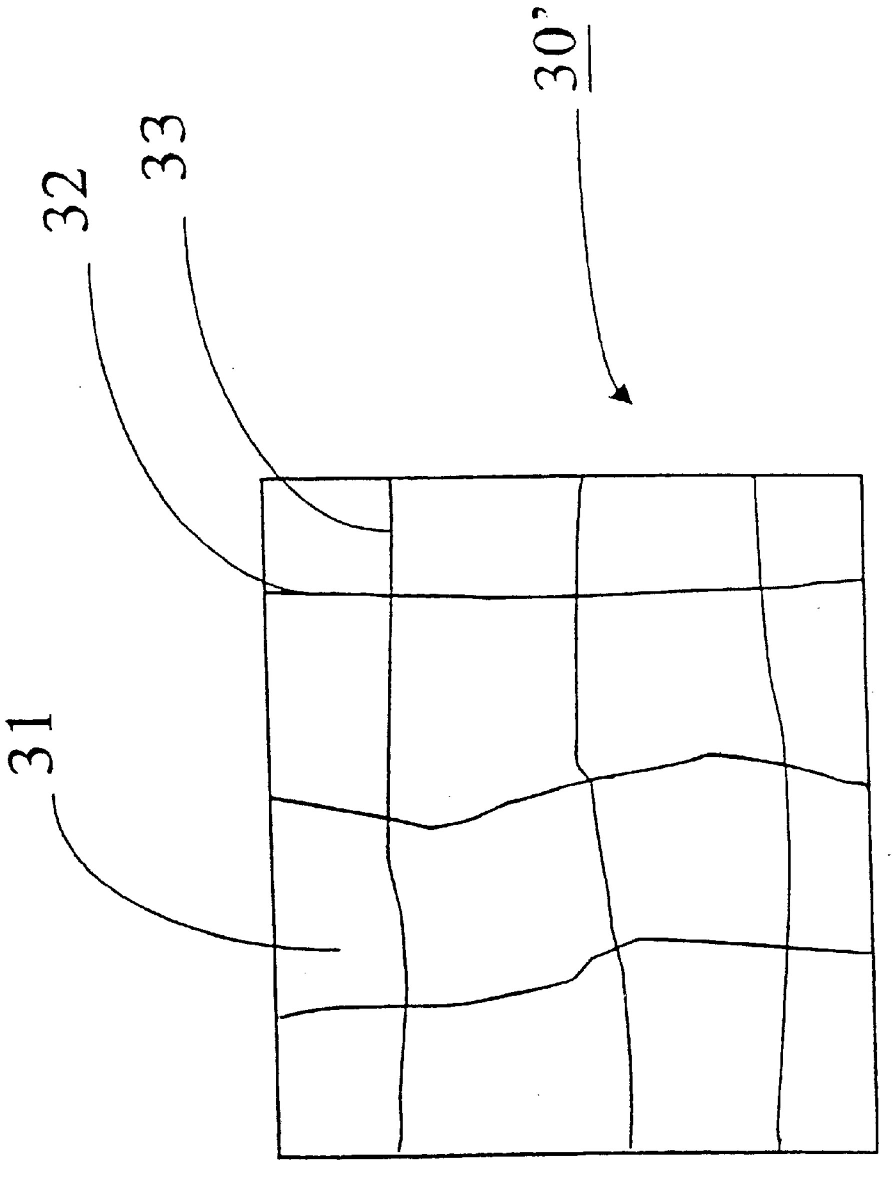
FIG. 15 is another process diagram of the third embodiment of the present invention.
Figure 16:
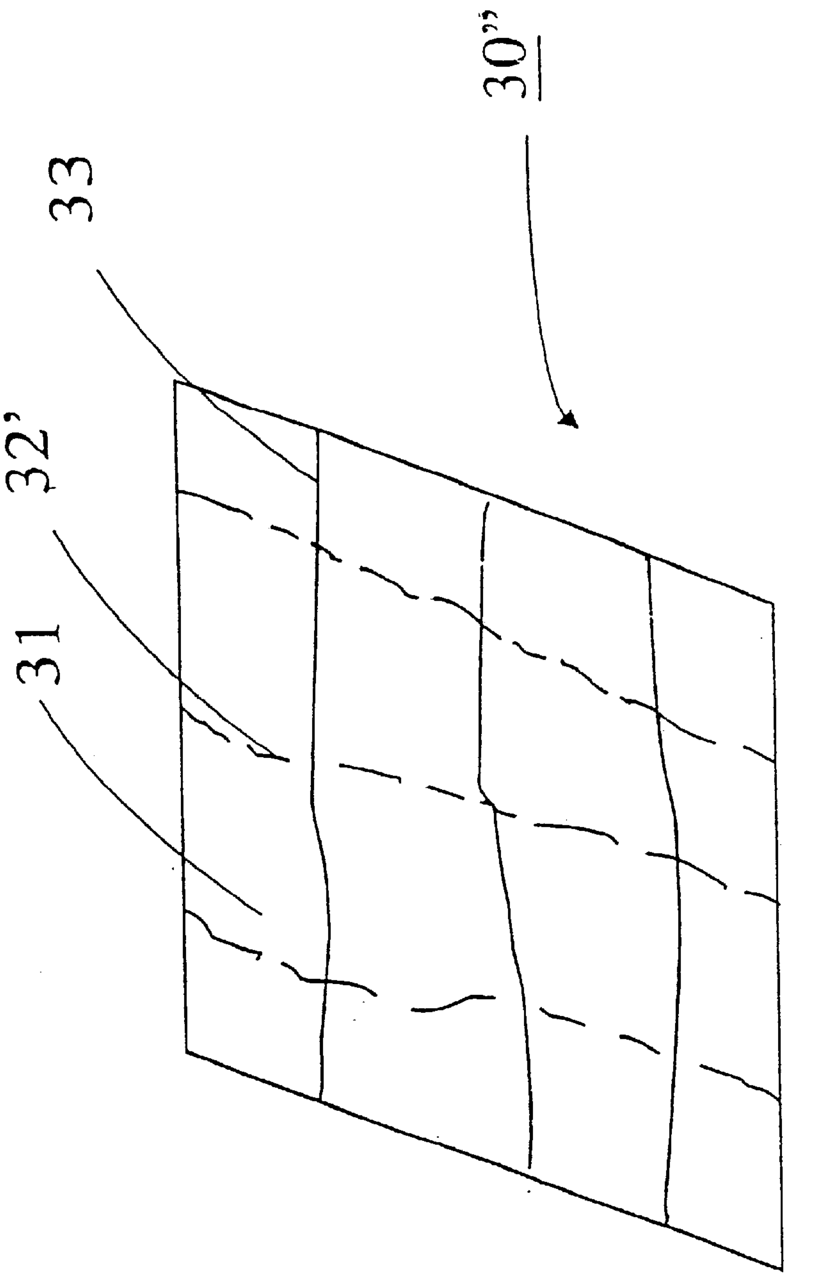
FIG. 16 is yet another process diagram of the third embodiment of the present invention.

FIGS. 14 to 16 show the producing progress of the third embodiment of the present invention. In the embodiment, a high-density polyethylene (HDPE) Petrothene LB832 (a product of Equistar Co. of U.S.) is used as a polymeric substrate 30, and carbon black Raven 450 (a product of Columbian Co. of U.S. has a DBP (Dibutyl Phthalate) oil absorption for about 65 ml/100 g) is used as conductive particles. The weight percentage of these conductive particles mixed in the substrate in the present embodiment is 50%. FIG. 14 shows conductive particles 32 aligned in a first direction, and conductive particles 33 aligned in a second direction. The polymeric substrate mixed with conductive particles becomes a filled composite 30.

Gamma Rays with a dosage more than 10 Mrads is used to irradiate the filled composite 30. The polymeric substrate phase would be cross-linked, and thus the whole filled composite would have the ability to memorize shapes. In the present embodiment, the filled composite 30 is irradiated by Co-60 with a dosage of 20 Mrads to cause a cross-link reaction in the filled composite 30. Thus the filled composite 30 turns into a filled composite 30' that is able to memorize shapes as shown in FIG. 15.

Referring to FIG. 16, the filled composite 30' is then processed by a simple shear. The strain of the simple shear is in the range of 1% to 300%. The strain applied in the present embodiment is about 100%, to make the filled composite 30' becomes filled composite 30" after the process, and the conductive particles 32 aligned in the first direction turn into conductive particles 32' having a discontinuous phase aligned in a single direction from the original conductive continuous phase. That is to say, the alignment of the conductive particles 32' aligned in the first direction in the filled composite 30" after the process is not conductive now.

Figure 17:
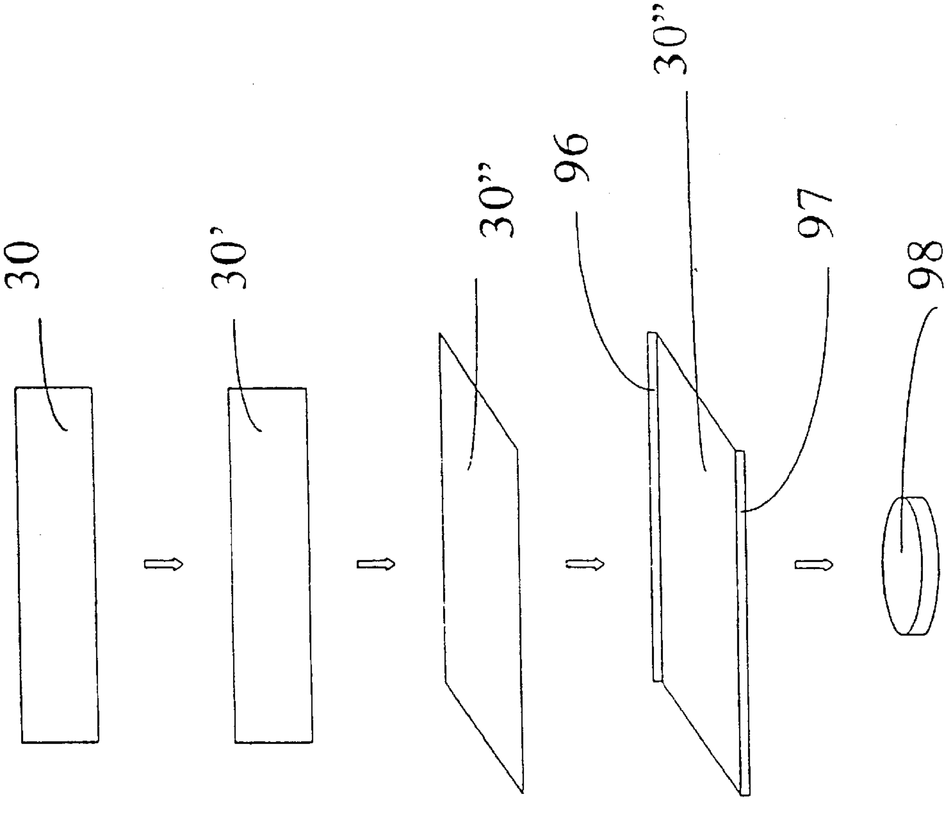
FIG. 17 is a manufacturing diagram of a thermistor of the third embodiment of the present invention.
Figure 18:
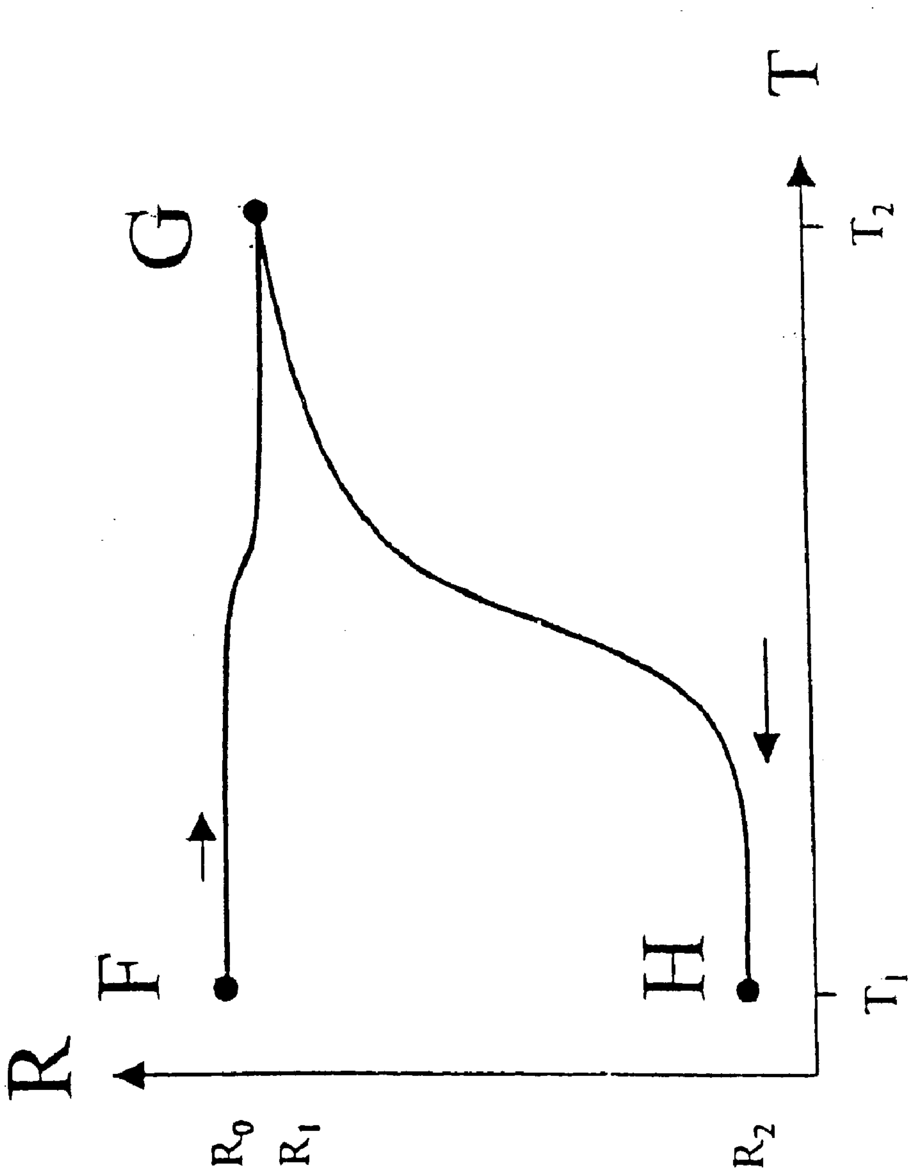
FIG. 18 is a resistance vs. temperature diagram of the thermistor of the third embodiment of the present invention.
Figure 19:
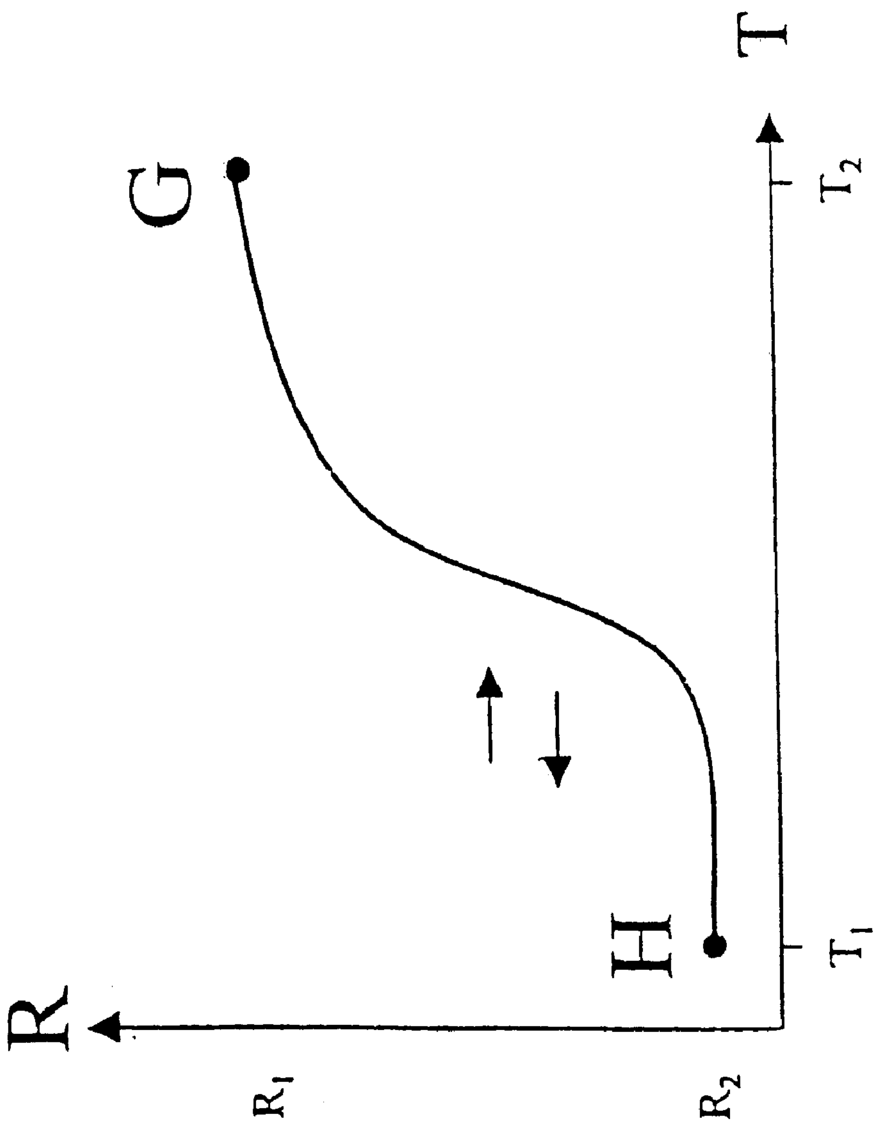
FIG. 19 is another resistance vs. temperature diagram of the thermistor of the third embodiment of the present invention.

Referring to FIG. 17, electrodes 96 and 97 are added to the filled composite 30", and then the processed filled composite 30" is segmented into a thermistor device 98 with a diameter of 15 mm. The thermistor device 98 is heated to 150° C. to melt the HDPE, and then the filled composite 30" that is deformed due to the simple shear process recovers to the original memorized shape 30'. Although the 100% strain is eliminated, but the volume of the HDPE substrate phase expands more than 10% when the filled composite 30" is heated up to a temperature higher than the melting point. Thus the carbon black particles that are low structure breakdown from the expansion of the substrate to form discontinuous and non-conductive structures. Referring to FIG. 18, the resistance of the thermistor device 98 at point G is in a high resistance $R_1$ status when the temperature rises to 150° C. ($T_2$), while the original resistance is $R_0$ at point F. When the temperature goes back to the room temperature $T_1$, the volume of the HDPE shrinks significantly from crystallization. Thus conductive particles that are breakdown from the expansion of the HDPE substrate recover to a connected conductive state. As a result, the resistance is lowered to a low resistance $R_2$. Afterward, the device returns to be a normal polymeric positive temperature coefficient (PPTC) device, whose resistance remains at a low resistance state at room temperature $T_1$ and remains at a high resistance state when the temperature is risen to above the melting point of the polymeric substrate shown in FIG. 19.

From the description above, the polymeric thermistor provided by the present invention has a negative temperature coefficient during the first heating course. Thus the design and application of the circuit is not restricted to the traditional polymeric positive temperature coefficient thermistor device. The application of the polymeric thermistor can be broadened.

Besides, the present invention also provides a structure for polymeric thermistor. When the thermistor is put to use for the first time, the resistance is maintained at a relative high state. Once it is put to use at a high temperature (i.e., the temperature of the device has been risen to the glass-transition temperature or melting point of the polymeric substrate), the resistance would be relatively lowered down.

Moreover, the present invention also provides a manufacturing method of a structure for a polymeric thermistor, which utilizes a simple-sheared process to change the microstructure of the conductive filler, and thus change the electrical properties accordingly for a broader application.

Furthermore, the present invention provides a manufacturing method of a structure for a polymeric thermistor, which can manufacture polymeric thermistors filled with conductive filler having different thermal-sensing natures. A new perspective of the possible application of the process is given.

The technical contents and features of the present invention are disclosed above. However, anyone that is familiar with the technique could possibly modify or change the details in accordance with the present invention without departing from the technologic ideas and spirit of the invention. For example, altering the chosen polymeric material, such as various kinds of crystallized polymeric materials like low-density polyethylene (LDPE), linear low-density polyethylene (LLDPE), polypropylene, or other alkene copolymers, such as ethylene-acrylic acid copolymer or other amorphous polymeric materials. As described above, the composite can be used as long as it is able to stand the strain from simple shear. As for the amount of conductive particles added, it mainly depends on the capability of conductive filled phase turning into a non-conductive status from a conductive status after the simple-sheared process. The sheared strain of the filled composite or the heating temperature are altered according to material chosen, wherein the heating temperature is the glass-transition temperature for polymeric amorphous thermoplastic materials or polymeric thermosetting materials, and the melting point for crystalline materials. The percentage of conductive particles mixed in can be altered or an extra manufacturing process after the simple-sheared process is performed. All above modifications still achieve the same effect. The protection scope of the present invention shall not be limited to what embodiments disclose, it should include various modification and changes that are made without departing from the technologic ideas and spirit of the present invention, and should be covered by the claims mentioned below.

What is claimed is:

1. A method for manufacturing a structure for polymeric thermistor device, comprising the steps of:

providing a polymeric substrate;

mixing conductive particles into the polymeric substrate, such that the polymeric substrate mixed with the conductive particles turns into a filled composite;

cross-linking the filled composite; and performing a shearing process to the cross-linked filled composite to make the strain of the filled composite be more than 1% such that the conductive particles aligned in a direction turn into conductive particles having a discontinuous phase aligned in a single direction from an original conductive continuous phase.

2. The method according to claim 1, wherein the polymeric substrate is high-density polyethylene.

3. The method according to the claim 1, wherein the conductive particles are highly conductive nickel powder or silver powder.

4. The method according to claim 1, wherein the weight percentage of the mixed conductive particles is between 5% and 50%.

5. The method according to claim 1, wherein the step of cross-linking is accomplished by irradiating the filled composite with Gamma Rays.

6. The method according to the claim 1, wherein the strain of the shearing process is in a range between 5% and 300%.

7. The method according to the claim 1, wherein the conductive particles are highly conductive nickel powder or silver powder.

8. A method for manufacturing a structure for polymeric thermistor device, comprising the steps of:

providing a composite that is mixed with conductive particles;

cross-linking the composite that is mixed with the conductive particles; and performing a shearing process to the cross-linked composite, such that the conductive particles in the composite form a discontinuous phase in a direction.

9. The method according to claim 8, wherein the composite is high-density polyethylene.

10. The method according to claim 8, wherein the weight percentage of the mixed conductive particles is between 5% and 50%.

* * * * *